Figure 3:
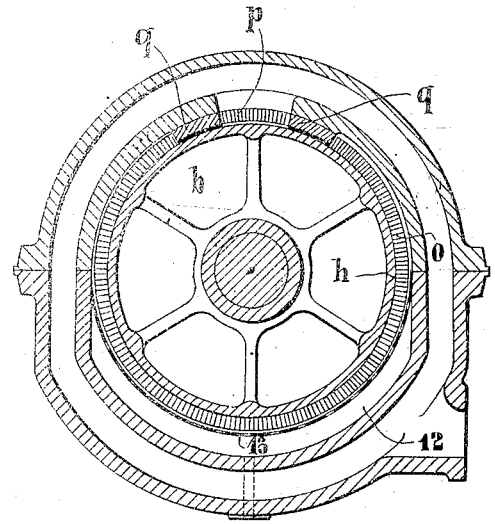

C. A. PARSONS.
TURBINE.
APPLICATION FILED DEC. 12, 1908.
958,430.
Patented May 17, 1910.
10 SHEETS—SHEET 1.
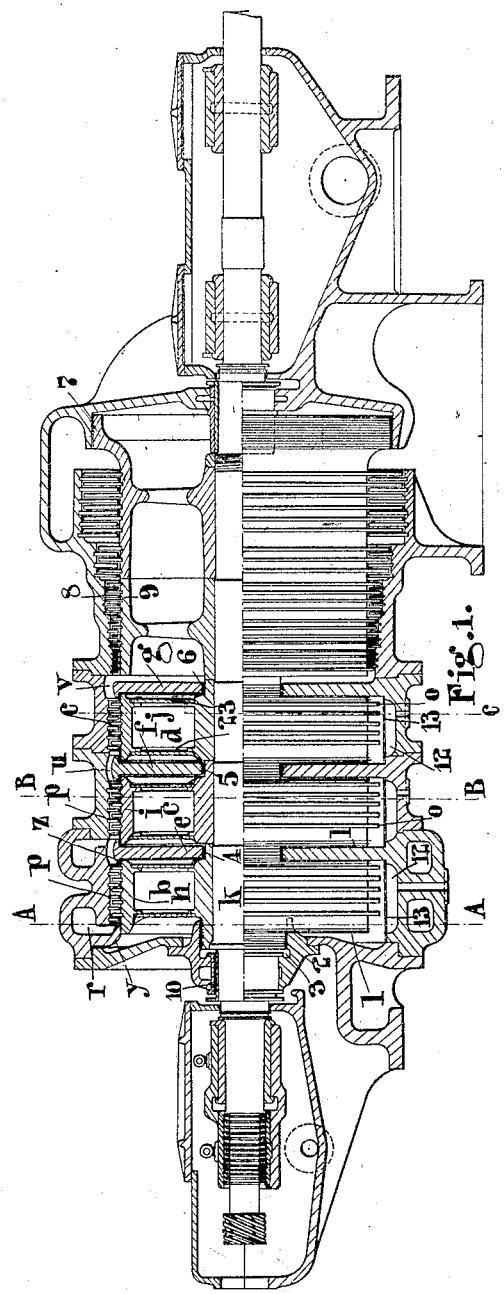
Attest.
Bent. M. Stahl.
Edward N. Saxton.
Inventor.
Charles A. Parsons
by Spear, Middleton, Donaldson & Spear
Attys.

C. A. PARSONS.
TURBINE.
APPLICATION FILED DEC. 12, 1909.

958,430.

Patented May 17, 1910.
10 SHEETS—SHEET 2.

Attest.
Berth M. Stahl.
Edward N. Sarton.

Inventor.
Charles A. Parsons
by Spear, Middleton, Donaldson & Spear
Attys.

C. A. PARSONS.
TURBINE.
APPLICATION FILED DEC. 12, 1908.

958,430.

Patented May 17, 1910.
10 SHEETS—SHEET 3.

Attest,
Bent M. Stahl.
Edward N. Saxton

Inventor,
Charles A. Parsons,
by Spear, Middleton, Donaldson & Spear
Attys

C. A. PARSONS.
TURBINE.
APPLICATION FILED DEC. 12, 1908.
958,430.
Patented May 17, 1910.
10 SHEETS—SHEET 4.
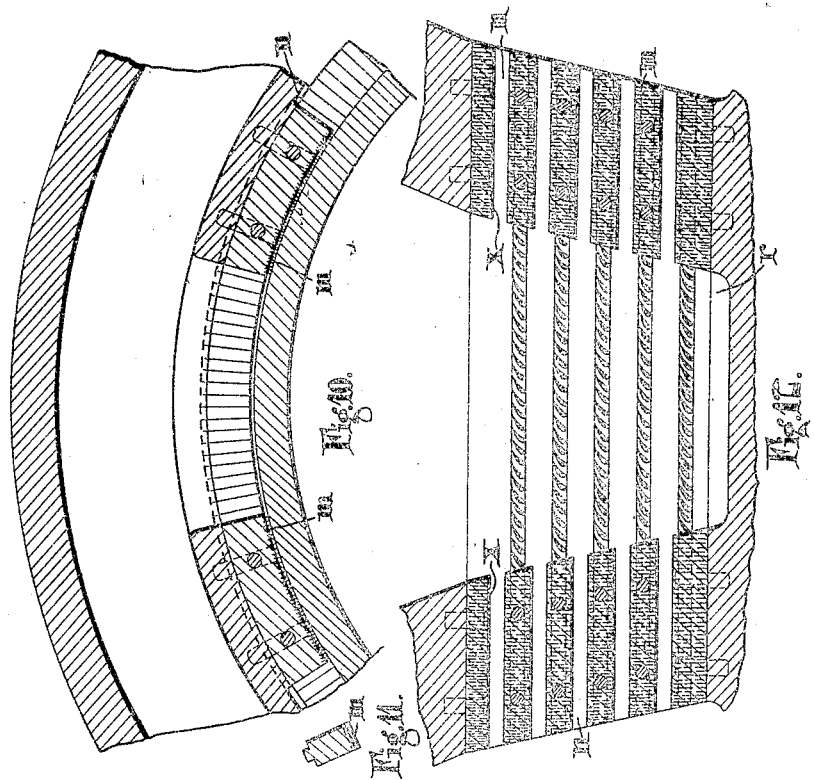
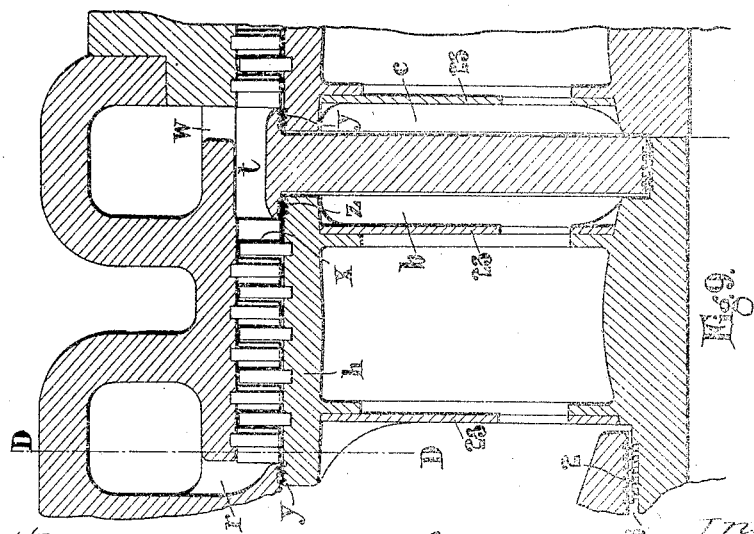

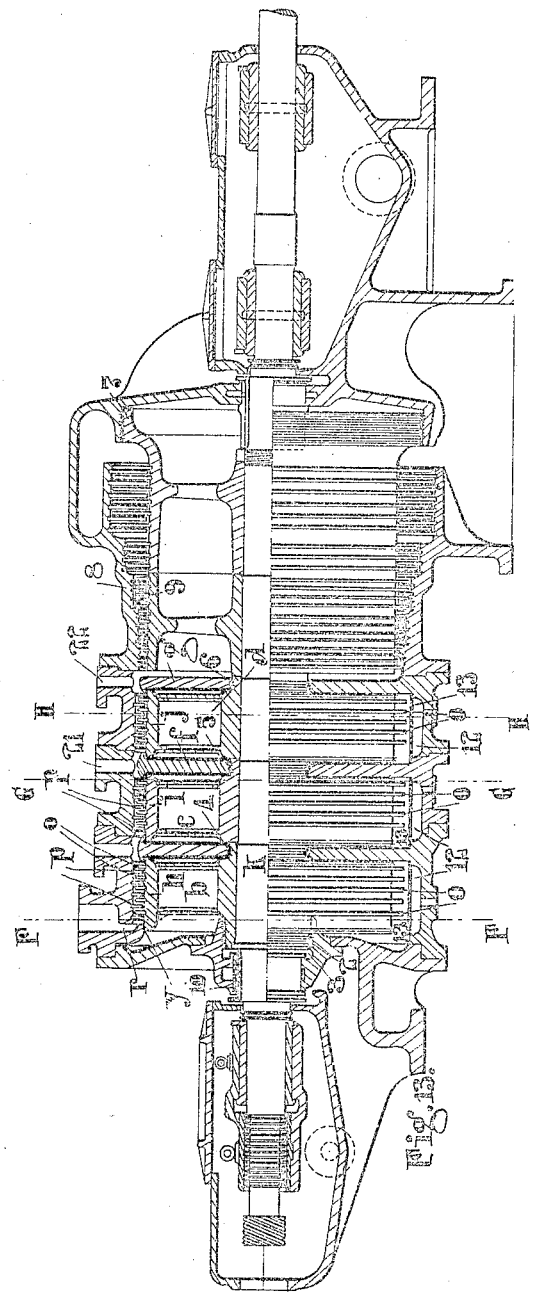

C. A. PARSONS.
TURBINE.
APPLICATION FILED DEC. 12, 1908.

958,430.

Patented May 17, 1910.
10 SHEETS—SHEET 6.

Inventor
Charles A. Parsons

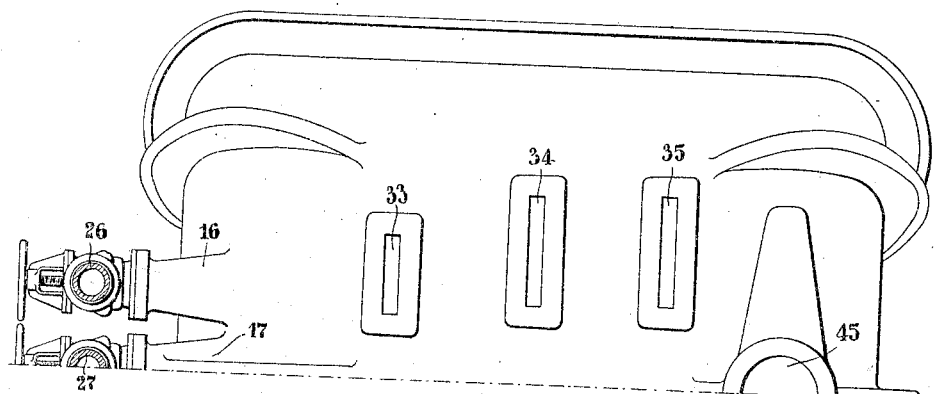
Fig. 23.
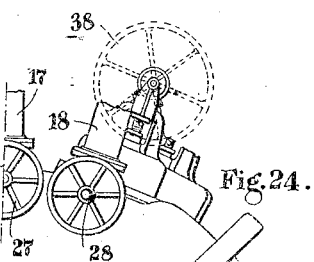
Fig. 24.
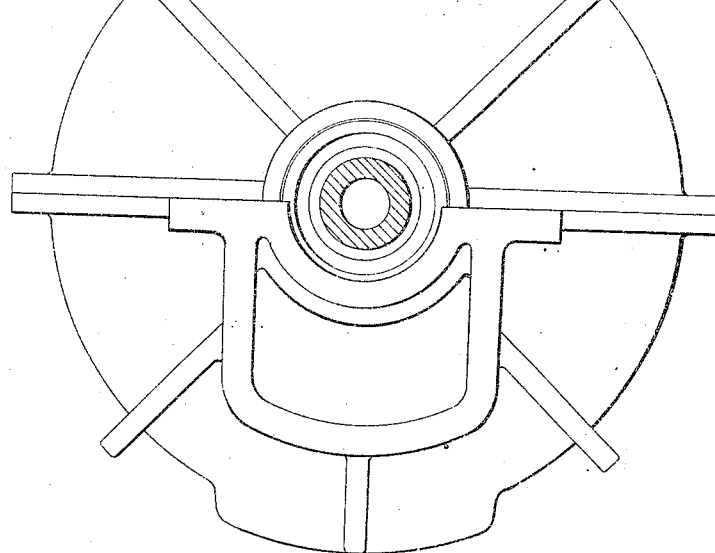

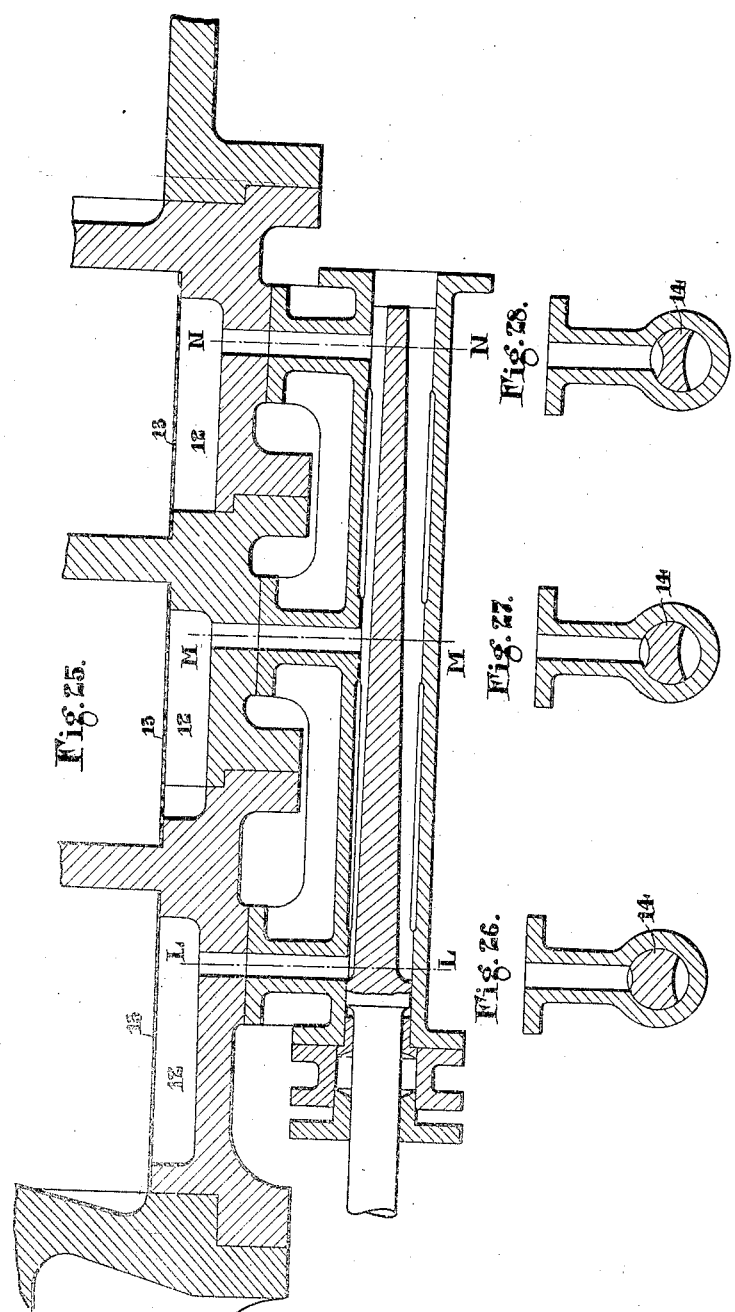

UNITED STATES PATENT OFFICE.

CHARLES ALGERNON PARSONS, OF NEWCASTLE-UPON-TYNE, ENGLAND.

TURBINE.

958,430.        Specification of Letters Patent.        Patented May 17, 1910.

Application filed December 12, 1908. Serial No. 467,266.

*To all whom it may concern:*

Be it known that I, CHARLES ALGERNON PARSONS, a subject of the King of Great Britain and Ireland, residing at Heaton Works, Newcastle-upon-Tyne, in the county of Northumberland, England, have invented certain new and useful Improvements Relating to Turbines, of which the following is a specification.

This invention relates to compound turbines of the type in which the velocity of the steam through successive rows of guides and moving blades is maintained chiefly or entirely by dropping pressure in the rows of guides and in the rows of moving blades, as occurs for instance in turbines provided with what is well known as "Parsons" blading.

Although certain practical difficulties, including excessive clearance losses, which are present in the high pressure parts of the turbines of the above type when complete or annular admission of the working fluid is arranged, can be reduced when partial admission is arranged, all previous constructions of turbines, having this type of blading, constructed for partial admission have been found impracticable on account of the losses of working fluid occasioned by "spilling" or on account of the great frictional losses produced by any means hitherto suggested for preventing such spilling. The practical difficulties above referred to in complete admission turbines are present in turbines used for marine propulsion though probably they have hitherto been most manifest in the cruising turbines used on board ship.

The object of this invention is to provide a partial impingement turbine, with blades of the above type, which shall not only overcome the difficulties above referred to but shall also prevent detrimental spilling losses as well as undue frictional losses.

I am aware of course that turbines with partial impingement have been patented and constructed by De Laval, Curtis and others, and that such turbines have been constructed of several wheels rotating in separate casings or in separate chambers within one casing, each casing or chamber constituting a stage at the commencement of which the working fluid is passed through jets to impart a high velocity to it and throughout which stage the fluid acting on the blades remains at a practically constant pressure.

As however there is thus little or no difference of pressure in the fluid acting on the blades at the several sets of moving blades and guides in each individual chamber there is in such turbines no serious spilling of working fluid to cause difficulty.

When compound turbines are designed for slow speeds of revolution and are consequently of large diameter, the height of the blades for a given power becomes very short, and the proportion of leakage through the clearance spaces becomes large and detrimental to efficiency. For example in the high pressure end of a cruising turbine of large power the rotating blades may be as short as one quarter of an inch while the clearance space required may be as much as one twenty fifth of an inch which causes in some cases such a great leakage of working fluid in the high pressure part of the plant that it is even necessary to reduce the available steam pressure of working fluid passing to the cruising turbine considerably below that for which the turbine is intended so as to diminish the loss of economy occasioned by excessive leakage.

Attempts have been made to reduce the proportion of clearance by blocking the guide ring save for a small sector of guides and increasing the height of the blades; but this measure not only failed much to reduce the leakage but introduced so much skin friction between the moving blades and the large surface of the blockings as to destroy its utility.

The present invention consists in dividing a compound turbine of the type referred to in the beginning of this specification into a number of separate elements working in separate chambers, each element having a plurality of rotating rings of blades alternating with segmental guides which terminate in short end-blockings.

The invention also consists in the division of a compound turbine of the type referred to into a number of separate wheels and drums on one or more shafts and working in separate chambers, the wheels or drums being sufficient in number to insure that only a moderate pressure drop shall take place in each chamber, and each wheel or drum having a sufficiently small number of rows of blades to reduce the loss arising from spilling of the steam at the ends of the sectors of guides to a small quantity.

By the use of sectors of guide blades without continuous blockings, the difficulty of skin friction is overcome and my invention enables partial admission to be applied to compound turbines with "Parsons" blading and also permits of the diameter of the turbine and the height of the blades to be largely increased while the speed of the turbine for good efficiency may be largely reduced and an increased steam pressure may be used advantageously.

The invention further consists in propelling machinery for vessels in which the higher stages of the expansion of the working fluid are effected in one or more of my partial admission turbines herein set forth, the remainder of the expansion being effected in any other suitable turbine whether of complete or partial admission or impingement type. Such a construction of turbine is specially well adapted to serve as a cruising turbine in marine propulsion, its consumption of steam being so very economical as compared with that of a cruising turbine of usual construction as greatly to improve the performance of the whole plant during cruising: it is also very applicable to ships of low speed such as cargo boats and intermediate liners. Moreover the construction lends itself to great facility of control of the turbine without reducing the initial pressure of the working fluid passing to the turbine.

When the invention is applied for stationary purposes I may or may not arrange it in the same casing with a turbine of the "Parsons" complete or annular admission parallel or radial flow type. When it is in the same casing as an annular flow turbine the whole expansion may be completed in the single casing although of course if preferred the parallel flow annular impingement portion may be in several casings. For marine purposes I prefer usually entirely to separate the partial admission from the complete admission portion, although even for marine purposes I may sometimes use the partial flow formation for the high pressure stages and the annular formation for the low pressure portion, whether the partial flow portion is used merely as a cruising turbine or as part or the whole of the high pressure portion of the main propelling machinery of any marine installation.

In the accompanying drawings, I have illustrated three forms of the invention; the first, illustrated in Figures 1 to 12, shows a turbine according to one construction in which partial admission portion, having a single line of steam guides, is combined within a casing with a complete admission parallel flow "Parsons" turbine, the expansion being completed in the single casing; the second illustrated in Figs. 13 to 17, shows a modified form of the previous mentioned construction in which there are three lines of steam guides; the third, illustrated in Figs. 18 to 24 shows a turbine as arranged in one manner to serve as a cruising turbine in marine propulsion, or for the high pressure stage in a slow speed vessel.

Figure 2:
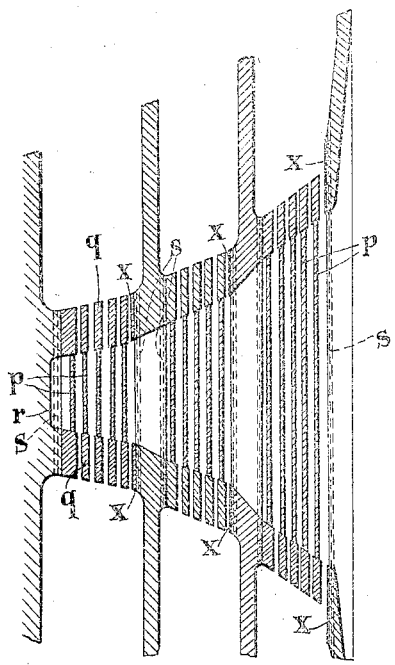
Figure 6:
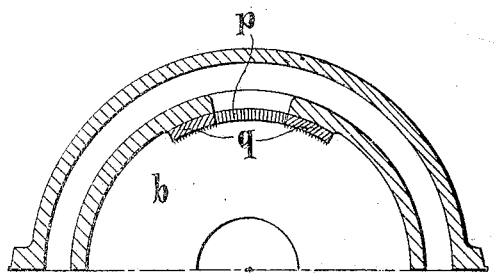
Figure 4:
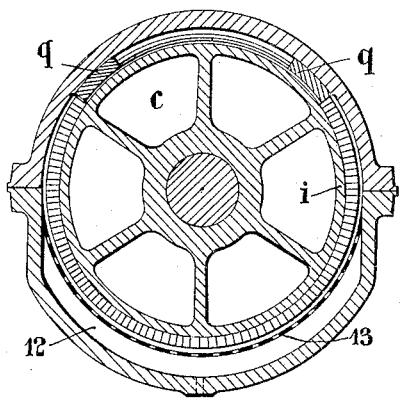
Figure 5:
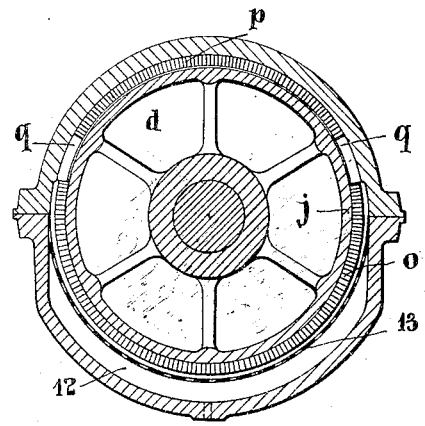
Figure 7:
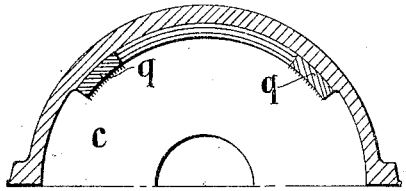
Figure 8:
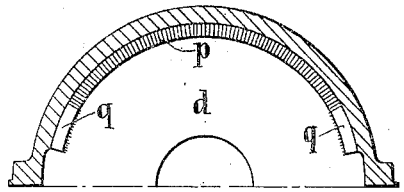
Figure 15:
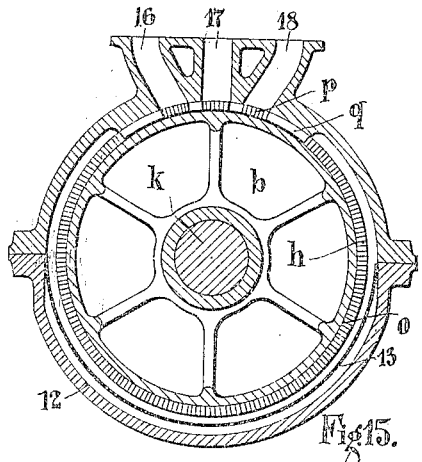
Figure 14:
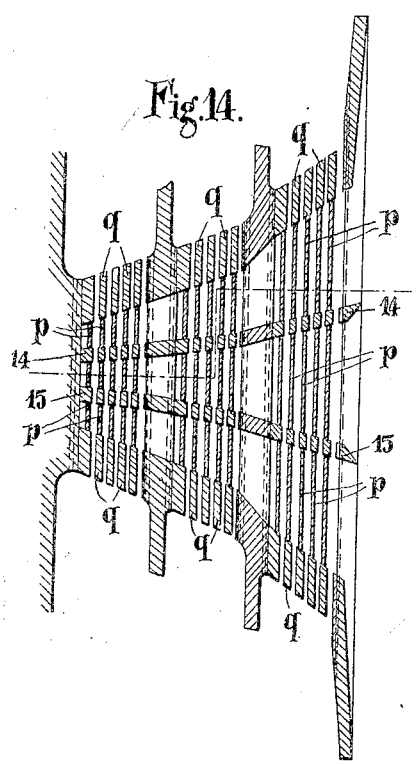
Figure 16:
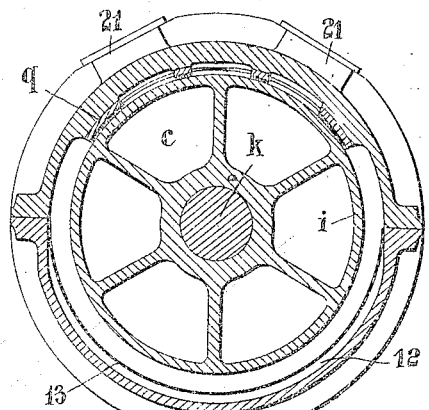
Figure 17:
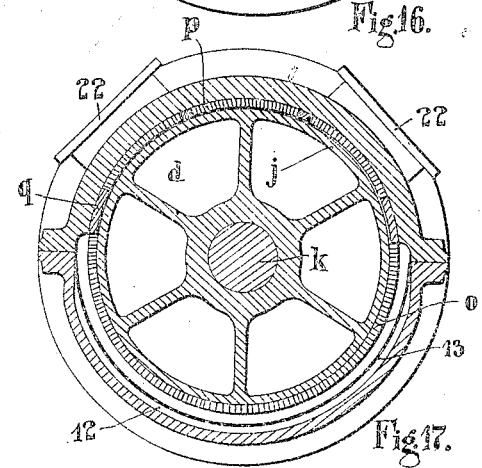
Figure 18:
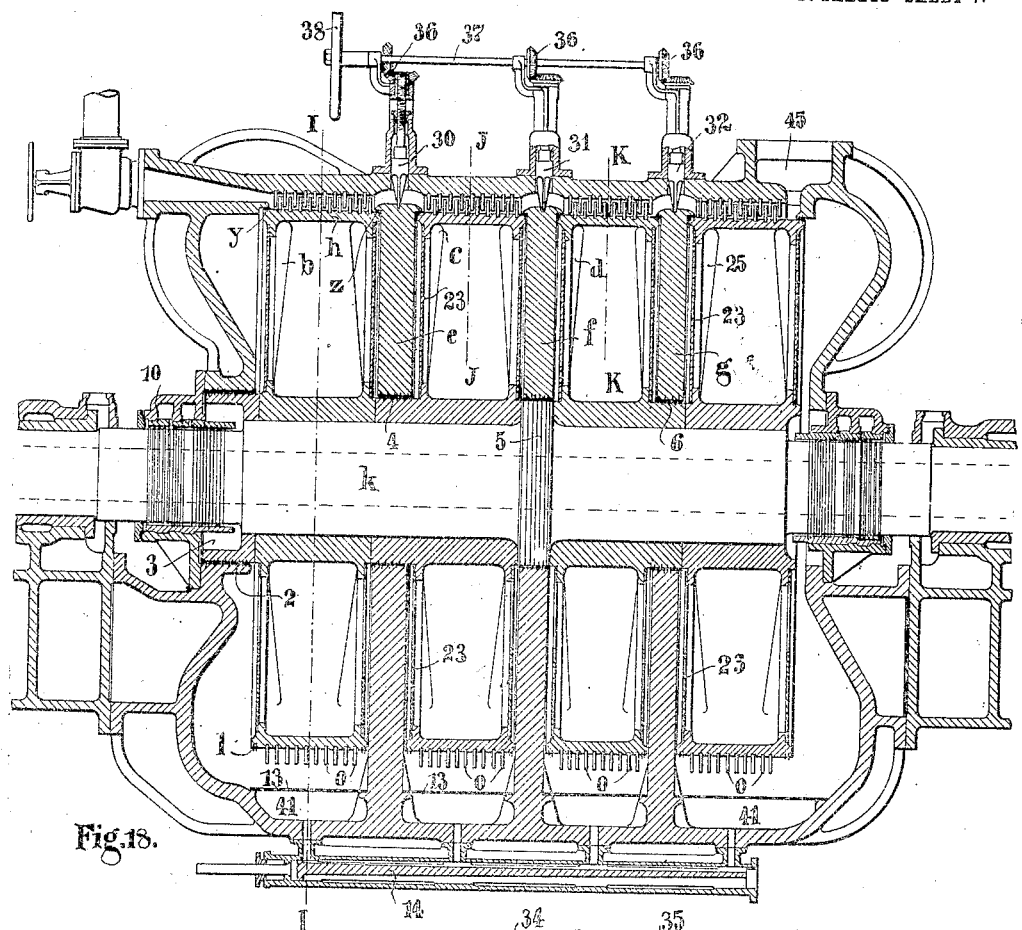
Figure 19:
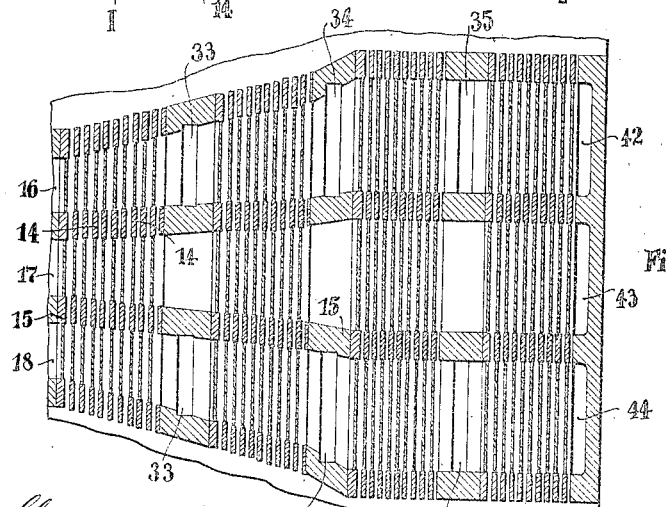
Figure 20:
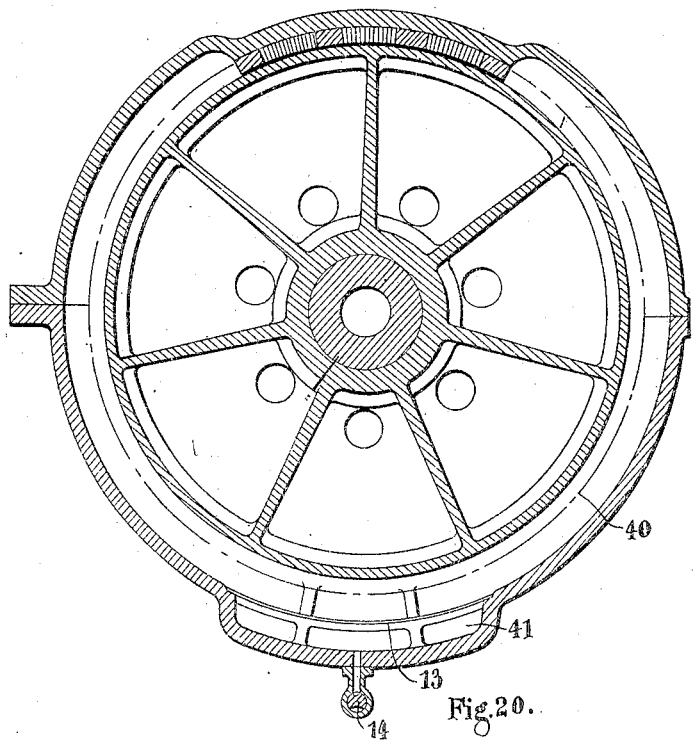
Figure 21:
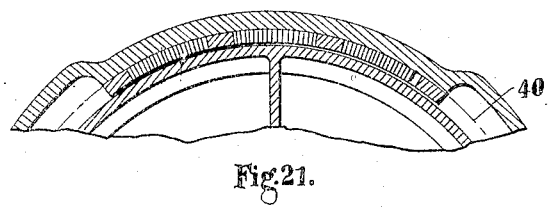
Figure 22:
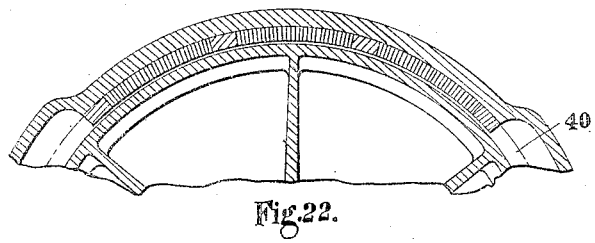

Referring to the drawings in detail, Fig. 1 is a sectional elevation of a combined partial and complete admission turbine, the lower half of the rotor being shown in elevation, Fig. 2 is a developed sectional diagram through the guide sectors and end blockings of the partial admission portion of the turbine. The working blades are not shown in this figure. Figs. 3, 4 and 5 are sectional views of the rotor and casing on the lines A A, B B and C C of Fig. 1, respectively, looking in the direction of the arrows. Figs. 6, 7 and 8 are similar views to Figs. 3, 4 and 5 but showing only the upper portion of the casing, the rotor being removed to show more clearly the guide sectors. Fig. 9 is an enlarged view of the upper left hand portion of Fig. 1, showing the packing and blades, the section being taken through the middle of the passage ways of the working fluid. Fig. 10 is a corresponding part sectional elevation on the line D D of Fig. 9. Fig. 11 is a cross sectional view of one of the end blockings. Fig. 12 is a developed sectional plan through the set of guide blades and end blockings of the first chamber shown in Figs. 1 and 9. Figs. 13 and 14 are views corresponding to Figs. 1 and 2 of a modified form of the invention in which three steam ways are arranged instead of only one. Figs. 15, 16 and 17 are cross sectional views on the lines F F, G G, and H H, of Fig. 13 respectively, looking in the direction of the arrows. Fig. 18 is a central longitudinal sectional elevation of a turbine in which only a part of the expansion of the steam is affected and as arranged in one manner for marine purposes, the turbine here represented being suitable for use as a cruising turbine. Fig. 19 is a developed diagrammatic sectional view of the guide sectors and end blocking showing three separate steam passages, the rotating blades being omitted. Figs. 20, 21 and 22 are cross sectional views on the lines I I, J J and K K, respectively of Fig. 18 but omitting parts such as controlling valves and wheels which would appear in elevation. Fig. 23 is a half plan of Fig. 18 but with the regulating valves and their controlling gear removed. Fig. 24 is an end elevation of Fig. 18 viewed from the inlet end, this figure showing at its upper left portion in section one of the regulating valves which are used in the right and left steam ways. Fig. 25 is a longitudinal sectional view of a form of drain device suitable for use in my partial admission turbine. Figs. 26, 27 and 28 are sections on the lines L L, M M, N N respectively of Fig. 25.

In carrying the invention into effect according to the form shown in Figs. 1 to 12, I divide the high pressure part, a, of the turbine casing into any convenient number of short chambers—say three—b c and d, by partition walls, e f and g. Inclosed in these chambers are rotary drums, h, i and j, which are mounted on the turbine spindle, k, and are provided with any suitable form of rotary packings at the casing and partitions as hereinafter further explained.

The drums carry a few rings of blades, o, of the Parsons type and the interior of the casing carries guide blades, p, of the same type, but these guide blades, instead of being continued all around the interior of the casing as is usual in turbines of the Parsons type are only arranged in sector form placed one after the other longitudinally of the turbine to form a single steam way, the ends of each sector being provided with short stops or end blockings, q, as shown diagrammatically in Fig. 2 and in detail in Figs. 9 to 12, the object of the end blockings being to prevent spilling out of the steam in the circumferential direction. It must be noted that the end blockings are of short length and that they do not extend around the casing. They are preferably formed somewhat wider than the guides and they lie very close to the adjacent blades in the longitudinal direction; except, however, between adjacent blank ended sectors the blades, o, rotate with large clearances in the chambers and thus avoid excessive skin friction. The end blockings may be constructed of finely laminated or soft material so as to avoid risk of damage to the moving blades, and they may project radially inward from the casing very close to the surface of the drum or with sufficient clearance to carry any of the usual forms of packing such for example as a number of fine edged strips, m, shown in full lines in Figs. 10 and 11 and in dotted lines in Fig. 12.

The guide blade sectors and the blanks are preferably secured in grooves cut in a raised portion, n, of the casing.

To obtain increasing volumetric capacity the sectors are of progressively increasing size toward the exhaust end of the turbine; r the blades toward the exhaust may be arranged with less obliquity to give greater passage way in which case the sector width may be kept constant as shown in the last two stages of Fig. 19.

In the partition walls are openings, t, u, v, opposite the guide sectors.

The working fluid, which I will consider throughout to be steam, although it might be any other suitable expansible fluid, is supplied to the passage r, Figs. 1, 2, 9 and 12, whence it passes into the chamber, b, through the first guide sector to the first ring of rotating blades and then through the second guide sector and second ring of rotating blades and so on, the steam from the last ring of blades on the drum, h, being delivered through the opening, t, in the partition, e, to the first guide sector in the next chamber, c. As the last row of blades on the drum, h, is in close proximity longitudinally (see Figs. 9 and 12) to the faces, x, at the sides of the opening, t, leading to the first sector of guides in the next chamber, c, the steam will spill only out of the first few sectors into the chamber, b, and will reënter the main flow at the succeeding sectors of that chamber, the pressure in which will be approximately a mean between that of the entering and delivering pressures to and from it. The loss due to spilling is actually a very small amount.

From the first chamber the steam passes through the line of sectors in the second and third chambers, the split steam being collected and reused in each chamber before being delivered to the next chamber or to the next turbine element which may partially or entirely complete the expansion. This other element is shown in Fig. 1, as a complete or annular admission "Parsons" turbine of the ordinary parallel flow type having complete rings of guide blades on the casing, 8, alternating with rings of rotary blades on the drum, 9, and having a dummy piston, 7, to balance the end thrust of this element.

If desired live steam may be delivered from a passage, w, Figs. 1 and 9 direct to the second chamber, c, similar passages may be provided at any of the other stages of the turbine.

It will be well understood that with a partial admission turbine having "Parsons" type of blading there will be steam and thrust to balance. A convenient way of effecting the balancing of the thrust is shown in Figs. 1, 2, 9 and 12, in which the drums are represented as carrying at both sides packing rings, l, coacting with segmental strips, s, on the interior of the casing at right and left to form segmental labyrinth packings, y and z, the steam pressure on area of the segmental packing, y, in a direction opposite to the flow of the steam being greater than that on z, in the direction of flow of the steam. The area thus afforded however is generally not sufficient to balance the steam thrust on the blades, but it is not desirable to increase the diameters of the drums at the packings, y, because by doing so the steam passage ways r, t, u, v, become unduly curved; obviously they should be kept as nearly straight as possible. In order to make up the necessary area for complete balancing, the bosses on the drums may be provided at the end walls of their respective chambers with packings of diameters which decrease progressively toward the exhaust end. Thus in the form shown in Fig. 1, the drum, $h$, is provided on the left with a labyrinth packing, 2, closing off the chamber, $b$, from a space, 3, at the inner end of the gland, 10, and on the right with a similar packing, 4,—but of considerably smaller diameter—in the partition wall, $e$. The drums, $i$ and $j$, in the chambers, $c$ and $d$, are provided on the right with labyrinth packings, 5 and 6, the packing, 5, being of smaller diameter than 4, and the packing, 6, being of smaller diameter than 5. It is not however always necessary to make the packings, 4, 5, 6 of different diameters; they may be made of the same diameter, and the necessary thrust for the three drums provided by making the packing, 2, of sufficiently larger diameter than the packings, 4, 5 and 6, to make up the desired area for balancing.

The steam delivered from the last partial impingement portion of the turbine may have access through the interior of the drum of the complete impingement low pressure turbine to the dummy piston, 7, a pipe connection (not shown) being preferably provided to put the interior of the drum, 9, into communication with the space, 3, so that the same pressure shall exist in both places.

It is desirable to provide a large drain water space, 12, in each section of the partial admission part, as shown in Figs. 1, 3, 4, 5 and 25, these spaces being preferably furnished with strainers, 13, 13. The drain spaces are preferably controlled by a single valve, 14, such as that shown in Figs. 25 to 28, the valve tapering so as to provide an increased opening toward the low pressure end.

I sometimes prefer to let the steam discharged from the last set of the moving blades of any chamber of the partial admission turbine deliver freely into that chamber instead of employing faces such as $x$, shown in Figs. 9 and 12 to prevent such free discharge. In this case the spilling losses will be greater because the steam will be spilt at each and all of the sectors in the chamber and mingled with the exhaust proper, will pass on to the succeeding chamber.

Although in the form of the invention above described and illustrated, a single steam way only is provided through the partial impingement portion of the turbine several such steam ways may be provided at suitable distances around the turbine or by very little modifications to the arrangement according to Figs. 1 to 12 several steam ways may be formed adjacent to one another; in either case the steam supplies to the several steam ways may be separately controlled. Thus, in Figs. 13 to 17, the sector of guides are divided by two sets of blanks, 14 and 15, the passageways in the division walls being correspondingly divided as shown in Fig. 14.

The three steam ways (see Fig. 15) are supplied with steam from the three pipes, 16, 17 and 18, each of which is preferably controlled by a valve operated by hand or from a governor. All the passage ways or only the side ones may if desired be provided with live steam admission ports such as 21 and 22 also controlled by hand or automatically. In other respects the turbine according to Fig. 13 is similar to that described with reference to the previous figures.

It will be noticed that the partial admission (high pressure) portion of the turbine according to this invention is made of practically the same diameter as the annular admission (low pressure) portion instead of being made much smaller than the latter as is usual when the high pressure portion consists of an annular admission turbine. As the permissible diameter of the high pressure portion is thus increased, I am able to obtain lower speeds of rotation while retaining the advantages resulting from the employment of blading of the "Parsons" type.

In carrying the invention into effect in suitable form for a cruising turbine or low speed turbine very little structural modification is called for but it is generally desirable to construct the partial admission turbine in a casing which is entirely separate from the casing or casings of the turbine or turbines in which the expansion of the steam is completed.

In Figs. 18 to 24 there is shown a suitable construction of cruising turbine, or turbine for a slow speed vessel in which turbine four separate chambers, $b$, $c$, $d$ and 25 are provided and three steam ways, supplied from three separate steam supply passages 16, 17 and 18, are formed by placing intermediate blanks, 14 and 15, in the guide sectors and passages in the partition walls $e$, $f$ and $g$, the steam passages 16, 17 and 18, being separately controlled by stop valves, 26, 27 and 28 (see Figs. 23 and 24). Each of the side steam ways through the guide sectors is controlled by a set of regulating valves, 30, 31 and 32 which work in slots 33, 34 and 35, in the casing and close upon the partition walls, $e$, $f$, $g$. The valves, 30, 31 and 32 on each side are preferably operated through bevel wheels, 36, and a rod 37 controlled by a hand wheel 38, or other suitable means. The valves 26 and 28, may if desired be linked to the corresponding set of regulating valves 30 31 32 to enable all the valves in each line of flow to be controlled or closed by one wheel. As shown in Figs. 20 21 and 22 the casing excepting at the sectors is carried a long way clear of the ends of rotating blades (represented by the dotted line, 40, in these figures) and a drain pocket, 41, closed by a strainer plate 13 collects the condensed water which is removed through a common drain valve, 14, such as that already described with reference to Figs. 25 to 28. The steam delivered from the last wheel of this turbine passes through three passages, 42, 43 and 44 to a common collecting pipe, 45, which conducts it to the turbine element or elements in which the expansion will be completed. Valves similar to those in the side passages may be placed in the passages, 42, 43, and 44, and controlled simultaneously with or independently of the side passage valves. When used for marine purposes this turbine may be connected in series or parallel series or in any other suitable manner with the remainder of the propelling plant. Such a turbine may conveniently be used alone or in combination with other elements for reversing. Provision similar to that described with reference to Fig. 1 may be made in the marine turbine for the purpose of balancing the steam thrust, but if desired the thrust of the propeller shaft may be used for this purpose. In this form of turbine as in the others previously described herein the running blades have large clearance in the chambers except over the comparatively small area between the blockings of the sector, the arrangement of which in relation to the running blades is substantially the same as that described with reference to Figs. 9 to 12.

The wheels of all the turbines are preferably provided at the sides with sheet metal perforated plates, 23, (see particularly Figs. 18 and 20) to serve as wind screens and reduce the resistance to rotation.

As shown in the diagrams the height of the blades is kept the same throughout the partial flow portion and the width of the sectors between the end blockings as well as the width of the partition opening is made larger as the steam pressure decreases in Figs. 1 and 13 and in chambers, b and c, of Fig. 18. The turbine may however, be constructed so that the widths of sector and partition openings are kept constant but the heights of the blades increased as the steam pressure decreases, or the angle of the blades may also increase toward the exhaust to increase the volumetric capacity in a manner well understood by those acquainted with turbine design. It will be understood of course that in respect of the details of blade shapes, spacings and angles, the drawings throughout are diagrammatic only.

Instead of constructing the rotor of the turbine with drums having spokes, I may, if preferred, employ disks.

My partial flow turbine may be used in combination with any other suitable type of turbine.

A turbine composed of partial flow and annular flow elements as in Fig. 1 or Fig. 13, may be used for the high pressure turbine in marine work whether such turbine effects in itself the complete expansion of the steam or whether with suitable modifications it is arranged to exhaust into other turbines which complete the expansion.

In all the forms of my partial admission turbine it is important that the number of separate chambers shall be such that only a moderate pressure drop shall take place between the inlet and outlet of each chamber and that the number of blades in any chamber shall be small in order to limit the possibilities of spilling for it will be readily seen that the more rows of blades there are used in any chamber the more opportunities there are for spilling to occur.

Having now described my invention what I claim as new and desire to secure by Letters Patent is:—

1. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form impingement zone or zones.

2. A turbine having in combination within a casing a number of successive stages each of which comprises a plurality of means for fractionally converting the pressure energy of the working fluid into kinetic energy, said converting means being carried by the turbine casing, reaction means interposed between said converting means for transforming said kinetic energy into mechanical energy while simultaneously further converting said pressure energy into kinetic energy, said converting means only partly extending over said reaction means and terminating in short end blockings to form impingement zone or zones.

3. A turbine having a number of successive stages, each of which comprises a plurality of means for fractionally converting the pressure energy of the working fluid into kinetic energy, a rotor element, reaction means on said rotor element interposed between said converting means for transforming said kinetic energy into mechanical energy while simultaneously further converting said pressure energy into kinetic energy, said converting means only partly extending over said reaction means and terminating in short end blockings to form impingement zone or zones.

4. A turbine having in combination within a casing a number of successive stages each of which comprises a plurality of means for fractionally converting the pressure energy of the working fluid into kinetic energy, a rotor element, reaction means on said rotor element interposed between said converting means for transforming said kinetic energy into mechanical energy while simultaneously further converting said pressure energy into kinetic energy, said converting means only partly extending over said reaction means and terminating in short end blockings to form impingement zone or zones.

5. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form impingement zone or zones, the area of said impingement zone or zones increasing gradually in the direction of flow of the working fluid through each stage.

6. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form impingement zone or zones, the area of said impingement zone or zones increasing gradually in the direction of flow of the working fluid through each stage, the increase in area being obtained by increasing the circumferential width of the impingement zone or zones.

7. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form impingement zone or zones, and means for regulating the supply of working fluid to said impingement zone or zones.

8. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form two or more consecutive impingement zones, a single blocking being placed between adjacent zones.

9. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form two or more consecutive impingement zones, a single blocking being placed between adjacent zones, and means placed between the successive stages to control the flow of working fluid through some of the impingement zones.

10. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form two or more consecutive impingement zones, a single blocking being placed between adjacent zones, and means for supplying working fluid separately to each impingement zone.

11. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form two or more consecutive impingement zones, a single blocking being placed between adjacent zones, means for supplying working fluid separately to each impingement zone and means for controlling such separate supply.

12. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form two or more consecutive impingement zones, a single blocking being placed between adjacent zones, means placed between the successive stages to control the flow of working fluid through some of the impingement zones, and means for supplying working fluid separately to each impingement zone.

13. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form two or more consecutive impingement zones, a single blocking being placed between adjacent zones, means placed between the successive stages to control the flow of working fluid through some of the impingement zones, and means for supplying working fluid separately to each impingement zone, and means for controlling such separate supply.

14. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form two or more consecutive impingement zones, a single blocking being placed between adjacent zones, means placed between the successive stages to control the flow of working fluid through some of the impingement zones, and means for simultaneously operating all of said means controlling the flow of working fluid through a single impingement zone.

15. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means, and terminating in short end blockings to form two or more consecutive impingement zones, a single blocking being placed between adjacent zones, means placed between the successive stages to control the flow of working liquid through some of the impingement zones, and means for supplying working fluid separately to each impingement zone, and means for controlling such separate supply, means for operating the separate supply controlling means for one impingement zone simultaneously with the means controlling the flow of working fluid through that impingement zone.

16. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form impingement zone or zones, the working fluid passing from the last of said stages into an annular admission reaction turbine in which its expansion is completed.

17. A turbine having in combination within a casing a number of successive stages each of which comprises a plurality of means for fractionally converting the pressure energy of the working fluid into kinetic energy, said converting means being carried by the turbine casing, reaction means interposed between said converting means for transforming said kinetic energy into mechanical energy while simultaneously further converting said pressure energy into kinetic energy, said converting means only partly extending over said reaction means and terminating in short end blockings to form impingement zone or zones, the working fluid passing from the last of said stages into an annular admission reaction turbine in which its expansion is completed.

18. A turbine having a number of successive stages, each of which comprises a plurality of means for fractionally converting the pressure energy of the working fluid into kinetic energy, a rotor element, reaction means on said rotor element interposed between said converting means for transforming said kinetic energy into mechanical energy while simultaneously further converting said pressure energy into kinetic energy, said converting means only partly extending over said reaction means and terminating in short end blockings to form impingement zone or zones, the working fluid passing from the last of said stages into an annular admission reaction turbine in which its expansion is completed.

19. A turbine having in combination within a casing a number of successive stages each of which comprises a plurality of means for fractionally converting the pressure energy of the working fluid into kinetic energy, a rotor element, reaction means on said rotor element interposed between said converting means for transforming said kinetic energy into mechanical energy while simultaneously further converting said pressure energy into kinetic energy, said converting means only partly extending over said reaction means and terminating in short end blockings to form impingement zone or zones, the working fluid passing from the last of said stages into an annular admission reaction turbine in which its expansion is completed.

20. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form impingement zone or zones, the area of said impingement zone or zones increasing gradually in the direction of flow of the working fluid through each stage, the working fluid passing from the last of said stages into an annular admission reaction turbine in which its expansion is completed.

21. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form impingement zone or zones, the area of said impingement zone or zones increasing gradually in the direction of flow of the working fluid through each stage, the increase in area being obtained by increasing the circumferential width of the impingement zone or zones, the working fluid passing from the last of said stages into an annular admission reaction turbine in which its expansion is completed.

22. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form impingement zone or zones, and means for admitting working fluid separately to any of said stages.

23. A turbine having in combination within a casing a number of successive stages each of which comprises a plurality of means for fractionally converting the pressure energy of the working fluid into kinetic energy, a rotor element, reaction means on said rotor element interposed between said converting means for transforming said kinetic energy into mechanical energy while simultaneously further converting said pressure energy into kinetic energy, said converting means only partly extending over said reaction means and terminating in short end blockings to form impingement zone or zones, and means for admitting working fluid separately to any of said stages.

24. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form impingement zone or zones, the area of said impingement zone or zones increasing gradually in the direction of flow of the working fluid through each stage, and means for admitting working fluid separately to any of said stages.

25. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form two or more consecutive impingement zones, a single blocking being placed between adjacent zones, and means for admitting working fluid separately to any of said stages.

26. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form impingement zone or zones, means for admitting working fluid separately to any of said stages, the working fluid passing from the last of said stages into an annular admission reaction turbine in which its expansion is completed.

27. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form two or more consecutive impingement zones, a single blocking being placed between adjacent zones, and means for admitting working fluid separately to any of said stages, the working fluid passing from the last of said stages into an annular admission reaction turbine in which its expansion is completed.

28. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form impingement zone or zones, means for draining condensed working fluid from said stages, said means providing an opening from each stage increasing in area in the direction of flow of the working fluid whereby each stage is drained in the same interval of time.

29. A turbine having in combination within a casing a number of successive stages each of which comprises a plurality of means for fractionally converting the pressure energy of the working fluid into kinetic energy, a rotor element, reaction means on said rotor element interposed between said converting means for transforming said kinetic energy into mechanical energy while simultaneously further converting said pressure energy into kinetic energy, said converting means only partly extending over said reaction means and terminating in short end blockings to form impingement zone or zones, means for draining condensed working fluid from said stages, said means providing an opening from each stage increasing in area in the direction of flow of the working fluid whereby each stage is drained in the same interval of time.

30. A turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form two or more consecutive impingement zones, a single blocking being placed between adjacent zones, means for supplying working fluid separately to each impingement zone and means for controlling such separate supply, means for draining condensed working fluid from said stages, said means providing an opening from each stage increasing in area in the direction of flow of the working fluid whereby each stage is drained in the same interval of time.

31. A turbine having in combination a casing, partitions dividing said casing into a number of compartments, a plurality of sectors of guide blades of the Parsons type carried by said casing within each compartment, a rotor element in each of said compartments, a plurality of rows of Parsons' type blading carried by said rotor and interposed between said fixed sectors, short end blockings at each side of said sectors of guide blades to form impingement zone or zones whereby skin friction and spilling losses are avoided.

32. A turbine having in combination a casing, partitions dividing said casing into a number of compartments, a plurality of sectors of guide blades of the Parsons type carried by said casing within each compartment, a rotor element in each of said compartments, a plurality of rows of Parsons' type blading carried by said rotor and interposed between said fixed sectors, short end blockings at each side of said sectors of guide blades to form impingement zone or zones whereby skin friction and spilling losses are avoided, the circumferential length of said sector of guide blades being increased in the direction of flow of the working fluid so as to provide an increased area of said impingement zone or zones for the expansion of the working fluid.

33. A turbine having in combination a casing, partitions dividing said casing into a number of compartments, a plurality of sectors of guide blades of the Parsons type carried by said casing within each compartment, a rotor element in each of said compartments, a plurality of rows of Parsons type blading carried by said rotor and interposed between said fixed sectors, short end blockings at each side of said sectors of guide blades to form impingement zone or zones whereby skin friction and spilling losses are avoided, and an annular admission reaction turbine within the same casing and receiving the working fluid exhausted from the last of said compartments.

34. A turbine having in combination a casing, partitions dividing said casing into a number of compartments, a plurality of sectors of guide blades of the Parsons type carried by said casing within each compartment, a rotor element in each of said compartments, a plurality of rows of Parsons type blading carried by said rotor and interposed between said fixed sectors, said sectors of guide blades terminating in short end blockings to form two or more consecutive impingement zones, a single blocking being placed between adjacent zones.

35. A turbine having in combination a casing, partitions dividing said casing into a number of compartments, a plurality of sectors of guide blades of the Parsons type carried by said casing within each compartment, a rotor element in each of said compartments, a plurality of rows of Parsons type blading carried by said rotor and interposed between said fixed sectors, said sector of guide blades terminating in short end blockings to form two or more consecutive impingement zones, a single blocking being placed between adjacent zones, and an annular admission reaction turbine within the same casing and receiving the working fluid exhausted from the last of said compartments.

36. A turbine having in combination a casing, partitions dividing said casing into a number of compartments, a plurality of sectors of guide blades of the Parsons type carried by said casing within each compartment, a rotor element in each of said compartments, a plurality of rows of Parsons type blading carried by said rotor and interposed between said fixed sectors, short end blockings at each side of said sectors of guide blades to form impingement zone or zones whereby skin friction and spilling losses are avoided, means for draining condensed working fluid from said stages, said means providing an opening from each stage increasing in area in the direction of flow of the working fluid whereby each stage is drained in the same interval of time.

37. In combination within one casing, a turbine of the partial impingement type having Parsons blading and short end blockings for the sectors of guide blades, and an annular admission reaction turbine.

38. A turbine having in combination a casing, partitions dividing said casing into a number of compartments, a plurality of sectors of guide blades of the Parsons type carried by said casing within each compartment, a shaft, a rotor element within each compartment and mounted on said shaft a plurality of rows of Parsons type blading carried by said rotor and interposed between said fixed sectors, short end blockings at each side of said sectors of guide blades to form impingement zone or zones, packings between said rotor elements and the casing or partitions, the packing in front of said rotor element in the direction of flow of the working fluid being subjected to a greater pressure than the packing at rear of the same rotor element whereby a certain amount of thrust in a direction opposite to the flow of working fluid is produced, packings between said partition and said shaft, a packing between said shaft and the casing, this packing being of larger diameter than the packings between the shaft and the partition whereby a further thrust is produced in a direction opposite to the flow of steam.

39. A turbine having in combination a casing, partitions dividing said casing into a number of compartments, a plurality of sectors of guide blades of the Parsons type carried by said casing within each compartment, a shaft, a rotor element within each compartment and mounted on said shaft, a plurality of rows of Parsons type blading carried by said rotor and interposed between said fixed sectors, short end blockings at each side of said sectors of guide blades to form inpingement zone or zones, packings between said rotor elements and the casing or partitions, the packing in front of said rotor element in the direction of flow of the working fluid being subjected to a greater pressure than the packing at rear of the same rotor element whereby a certain amount of thrust in a direction opposite to the flow of working fluid is produced, packings between said partition and said shaft, a packing between said shaft and the casing, this packing being of larger diameter than the packings between the shaft and the partition whereby a further thrust is produced in a direction opposite to the flow of steam, an annular admission reaction turbine receiving the working fluid exhausted from the last of said compartments, and a balancing piston at the rear end of said annular admission reaction turbine to complete the balancing of the thrust of the working fluid on the blades, said balancing piston being acted on by fluid drawn from the space between the last compartment and the annular admission reaction turbine.

40. Propelling plant for vessels comprising a turbine in which the high pressure expansion of the working fluid is effected, said turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form impingement zone or zones.

41. Propelling plant for vessels comprising a turbine in which the high pressure expansion of the working fluid is effected, said turbine having in combination within a casing a number of successive stages each of which comprises a plurality of means for fractionally converting the pressure energy of the working fluid into kinetic energy, a rotor element, reaction means on said rotor element interposed between said converting means for transforming said kinetic energy into mechanical energy while simultaneously further converting said pressure energy into kinetic energy, said converting means only partly extending over said reaction means and terminating in short end blockings to form impingement zone or zones.

42. Propelling plant for vessels comprising a turbine in which the high pressure expansion of the working fluid is effected, said turbine having a number of successive stages, each of which comprises a plurality of means for fractionally converting the pressure energy of the working fluid into kinetic energy, reaction means interposed between said converting means for transforming said kinetic energy into mechanical energy while simultaneously further converting said pressure energy into kinetic energy, said converting means only partly extending over said reaction means and terminating in short end blockings to form impingement zone or zones, the working fluid passing from the last of said stages into an annular admission reaction turbine in which its expansion is completed.

In testimony whereof, I affix my signature in presence of two witnesses.

CHARLES ALGERNON PARSONS.

Witnesses:
  HENRY GRAHAM DAHYNS, Jr.,
  FREDERICK GORDON HAY BEDFORD.